United States Patent
Guzik et al.

(10) Patent No.: US 7,240,777 B2
(45) Date of Patent: Jul. 10, 2007

(54) CONSTRAINED LAYER DAMPING ASSEMBLY

(75) Inventors: Nahum Guzik, Palo Alto, CA (US); Michael Christopher St. Dennis, San Jose, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 18 days.

(21) Appl. No.: 10/919,133

(22) Filed: Aug. 16, 2004

(65) Prior Publication Data
US 2006/0033249 A1 Feb. 16, 2006

(51) Int. Cl.
*F16F 13/00* (2006.01)

(52) U.S. Cl. .................... 188/379; 267/140.15

(58) Field of Classification Search ........... 267/292, 267/140.14, 140.15, 140.12; 188/378, 379; 248/566, 575
See application file for complete search history.

(56) References Cited

U.S. PATENT DOCUMENTS

| | | | | |
|---|---|---|---|---|
| 5,067,684 A | * | 11/1991 | Garnjost | 248/550 |
| 5,068,018 A | * | 11/1991 | Carlson | 204/554 |
| 5,401,008 A | * | 3/1995 | Winkler et al. | 267/140.13 |
| 5,984,233 A | * | 11/1999 | Snyder et al. | 244/119 |
| 6,110,985 A | * | 8/2000 | Wheeler | 521/83 |
| 6,385,918 B1 | * | 5/2002 | Robinson | 52/167.8 |
| 6,645,586 B2 | * | 11/2003 | Ohira et al. | 428/35.7 |

FOREIGN PATENT DOCUMENTS

FR 2630175 * 10/1989

* cited by examiner

*Primary Examiner*—Bradley King
(74) *Attorney, Agent, or Firm*—Mark G. Lappin; Foley & Lardner LLP

(57) ABSTRACT

A constrained layer damping assembly for a rigid base member having a substantially planar surface comprises a gas impervious damping layer disposed on the substantially planar surface of the base member, and a load element disposed on the damping layer. The damping layer defines at least one void region extending between the planar surface and the load element, and the load element defines at least one channel for coupling a low pressure to the void region relative to the pressure external to the constrained layer damping assembly to establish a pressure differential between the inside of the void region and the outside of the constrained layer damping assembly. The pressure differential keeps the damping layer under compression and secures the load element and the damping layer onto the base member.

22 Claims, 4 Drawing Sheets

CONSTRAINED LAYER DAMPING ASSEMBLY

FIELD OF THE INVENTION

The present invention relates damping assemblies for mechanical structure, in particular, to constrained layer damping assemblies.

BACKGROUND OF THE INVENTION

In the prior art, damping is used to reduce the amplitude of resonant vibration in mechanical assemblies by converting a portion of the energy into low-grade heat, often with the use of elastomeric materials. Typically, such vibration damping materials use a mechanism known as hysteretic damping to dissipate energy. When these materials are deformed, internal friction causes high energy losses to occur.

FIG. 1 shows a prior art vibration damping assembly as applied to two rigid plates 24 and 26. As shown in FIG. 1, an elastomeric isolation mount as denoted by number 29, is placed between the rigid plate members 24 and 26 to absorb vibratory energy in the plates. A bolt 29A and nut 29B couple the plates 24 and 26 together while maintaining the isolation mount 29 under compression. The isolation mount is made of a material with high loss factor, for example, materials manufactured by E-A-R Specialty Composites, carrying the trademark ISODAMP®.

One disadvantage of the prior art assembly shown in FIG. 1 is that the bolt 29A used for coupling plates 24 and 26 together is made of a rigid material with low loss factor, for example, steel, for effecting a secure connection. The bolt 29A, although isolated by an isolation material 28, as shown in FIG. 1, downgrades the damping effect of the damping assembly.

SUMMARY OF THE INVENTION

The present invention provides a constrained layer damping assembly for minimizing the amplitude of resonant vibration. The constrained layer damping assembly is positioned over a surface of a device body, for example, a top surface of a rigid structure, when in use. The damping assembly comprises a substantially gas impervious damping layer, which overlies at least a portion of the top surface, and an inertial mass (e.g., a load element) disposed on the damping layer. The constrained damping layer assembly further includes means for positioning the load element with respect to the top surface of the rigid structure while maintaining the damping layer in compression. The positioning means preferably includes at least one void region passing through the damping layer from the top surface of the rigid structure to the bottom surface of the load element, and means for coupling a low pressure to the void region relative to the pressure external to the constrained layer damping assembly. In one preferred embodiment, the constrained damping layer defines two void regions, and the load element defines two vacuum channels respectively associated with the two void regions for coupling the void regions to an external vacuum. In alternative forms, the two vacuum channels may be defined passing through the device body or the damping layer, coupling the void regions to the external vacuum. The vacuum, via the channels, keeps the pressure in the void regions at a relative low value to establish a pressure differential across the load element. The pressure differential provides a force, which keeps the damping layer under compression, and secures the load element and the damping layer to the top surface of the rigid structure.

In another preferred embodiment, the constrained damping layer defines multiple void regions, and each of the void regions are coupled to a low pressure by way of a channel extending from the void region through the load element.

The constrained damping layer is preferably characterized by a relatively high loss factor, for example, greater than 0.5. In one preferred embodiment, the constrained damping layer is characterized by a loss factor of 1.0. The loss factor is used to quantify the level of hysteretic damping of a material. The loss factor is the ratio of energy dissipated from the system to the energy stored in the system for every oscillation. An example of commercially available material with high loss factor is thermoplastic material, for example, materials sold under trademark ISODAMP®.

In one preferred embodiment, the constrained layer damping assembly is provided with a lockdown assembly for locking the load element and the damping layer to the device body when the damping assembly is not in use, and no pressure differential is provided to force the load element to the top surface of the device body. In one preferred form, the lockdown assembly includes a hole passing through the load element and the damping layer, and extending into at least a portion of the device body, and at least one bolt to be screwed into the hole for securing the load element and the damping layer to the device body. The hole is pneumatically isolated from the void region in the damping layer.

DETAILED DESCRIPTION OF THE PREFERRED EMBODIMENTS

Figure 1:
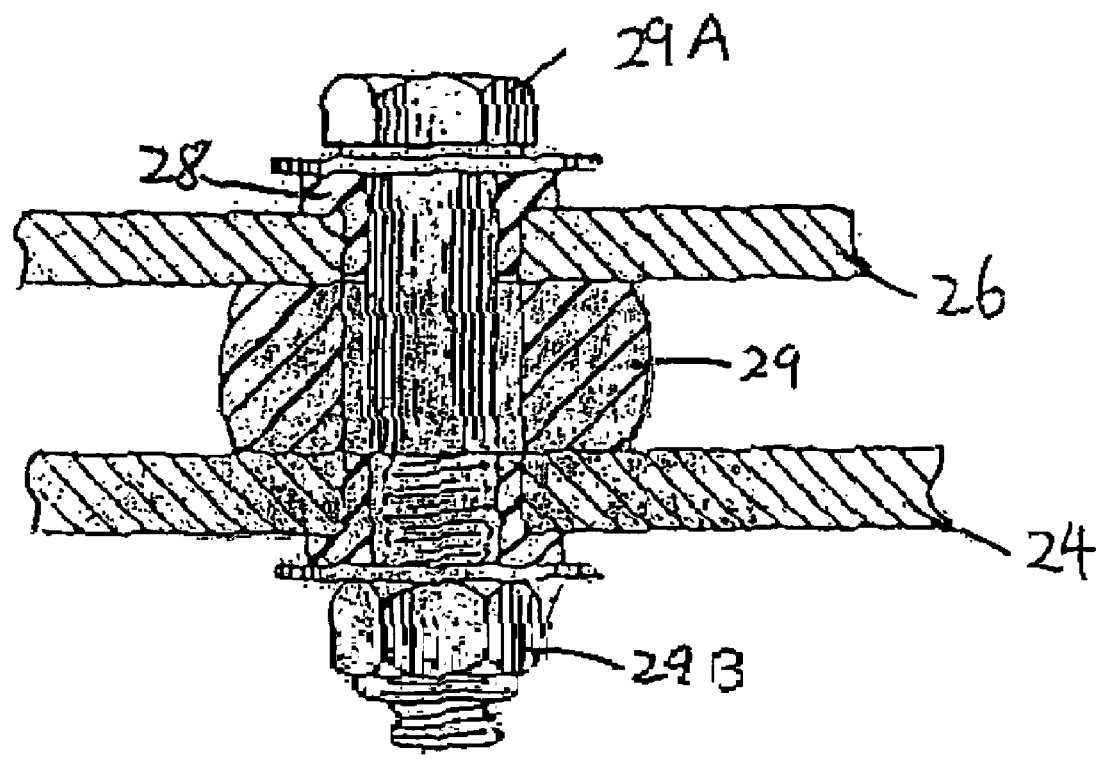
FIG. 1 is a schematic view of a prior art vibration isolation mechanism.
Figure 2:
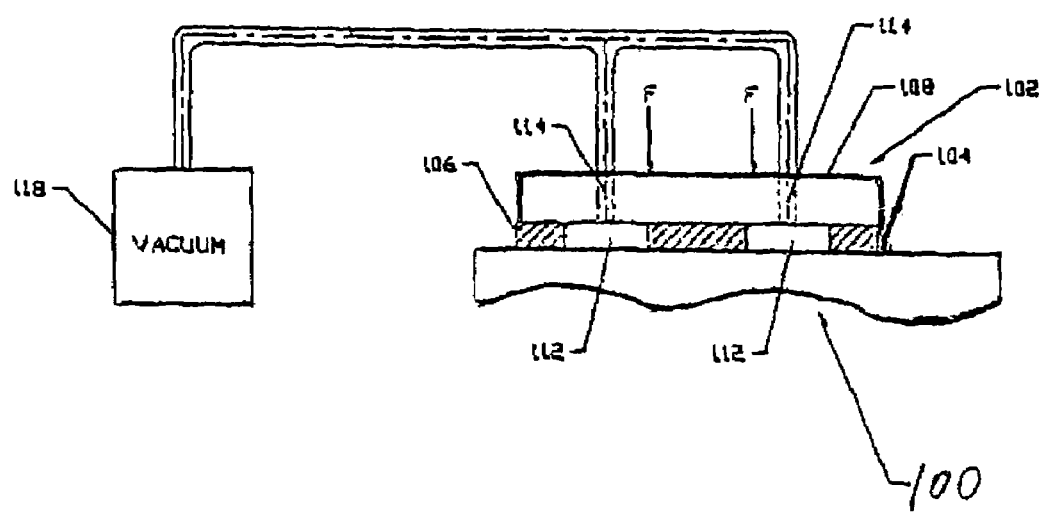
FIG. 2 is a cross-sectional view of a constrained layer damping assembly according to one preferred embodiment of the present invention, taken along the axis X-X.
Figure 3:
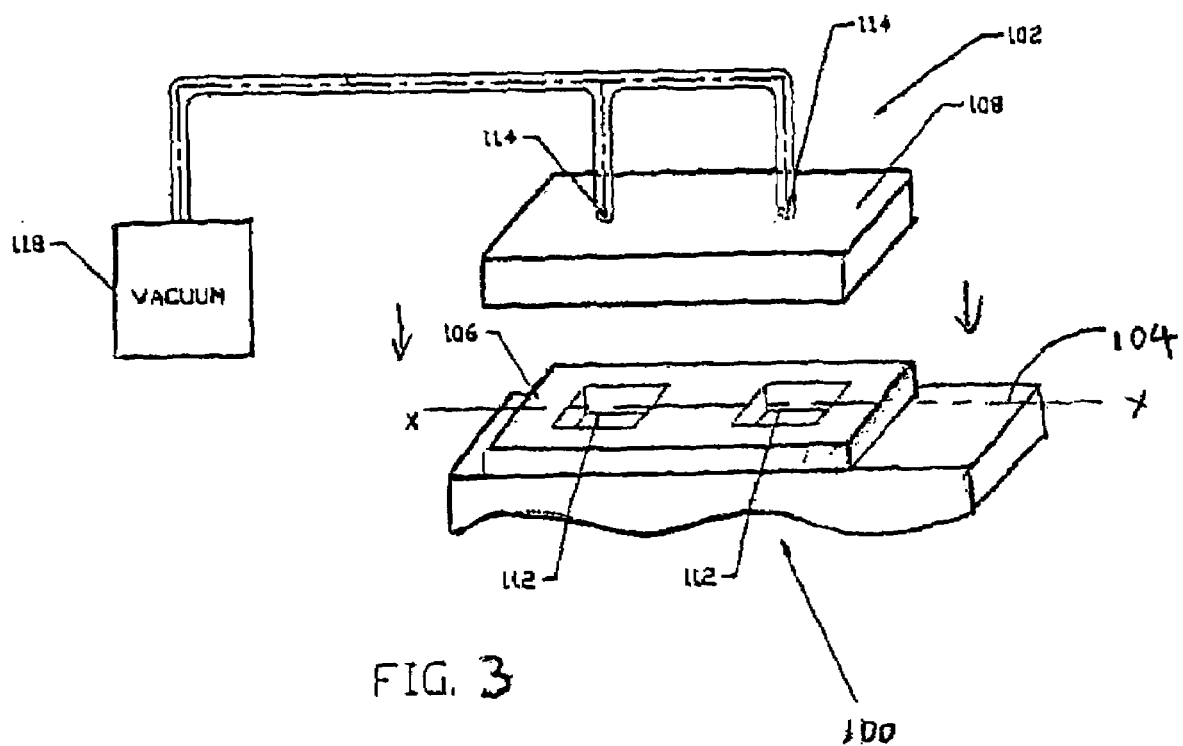
FIG. 3 is an exploded perspective view of the constrained layer damping assembly in FIG. 2.

The invention will now be further described in detail with reference to the following preferred embodiments. FIG. 2 illustrates a cross-sectional view and FIG. 3 illustrates an exploded view of a constrained layer damping assembly 102 according to one preferred embodiment of the present invention. The assembly 102 is positioned on a top surface 104 of a device body 100. It should be understood that the constrained layer damping assembly 102 can be used with any surfaces of any devices where a vibration damping is desired.

The damping assembly 102 is formed by at least a portion of the top surface 104 of the device body 100, a substantially gas impervious damping layer 106, which overlies at least a portion of the top surface 104, and an inertial mass (e.g., a load element) 108 disposed on the damping layer 106. The top surface 104 is preferably planar and extends along a reference axis X. The load element 108 is preferably rigid.

Figure 6:
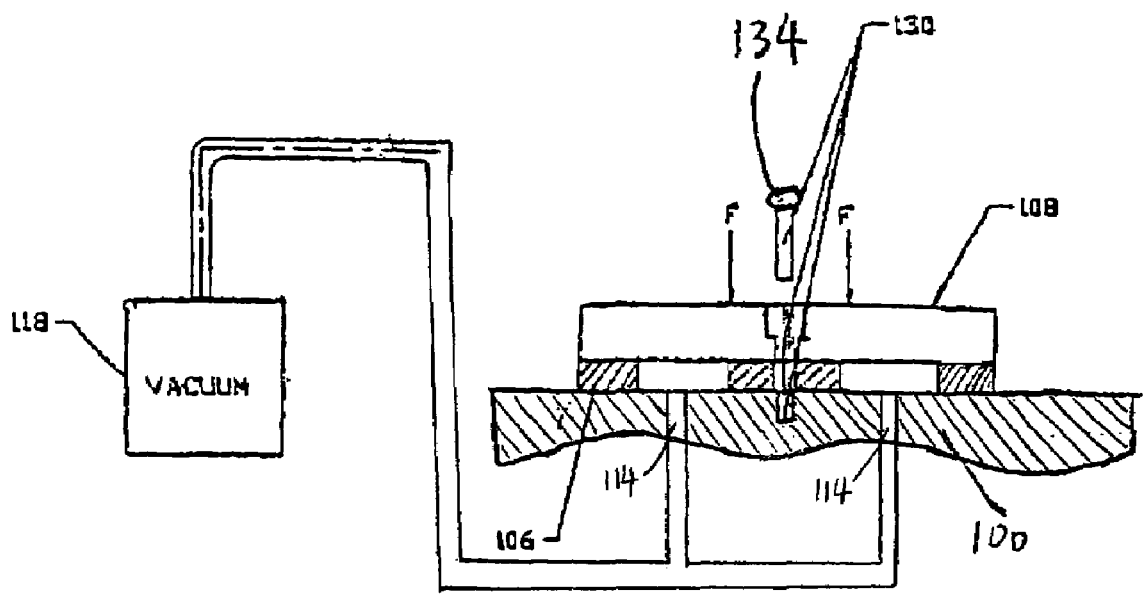
FIG. 6 is a cross-sectional view of a constrained layer damping assembly according to another preferred embodiment, taken along the central axis X-X.
Figure 7:
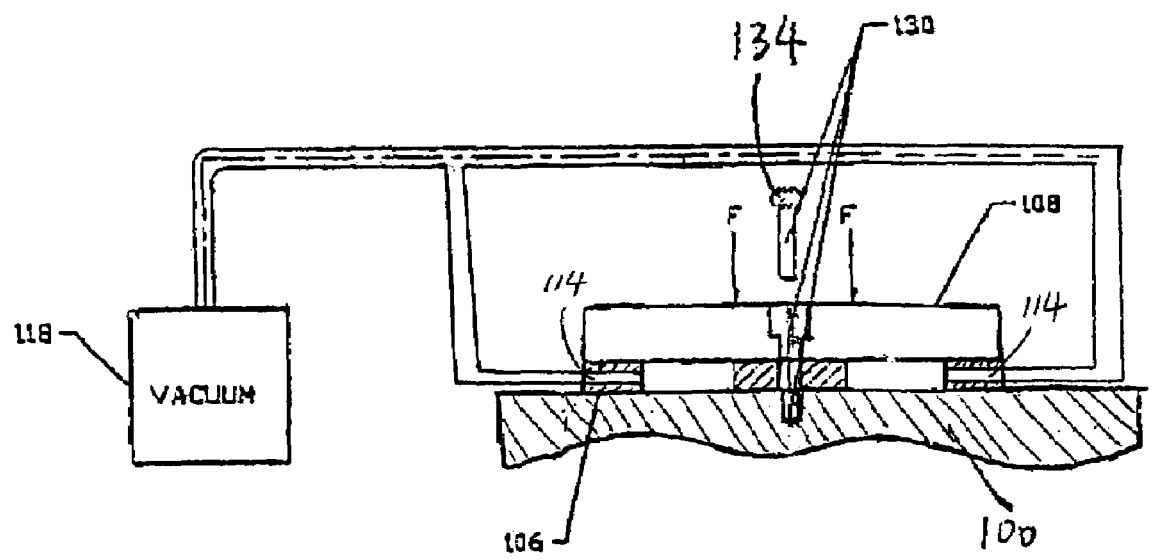
FIG. 7 is a cross-sectional view of a constrained layer damping assembly according to another preferred embodiment, taken along the central axis X-X.

The constrained layer damping assembly 102 further includes means for positioning the load element 108 with respect to the top surface 104. The positioning means preferably includes at least one void region defined within the damping layer 106 and extending between the top surface 104 and a bottom surface of the load element 108, and means for coupling a low pressure to the void region relative to the pressure external to the constrained layer damping assembly 102. In the preferred embodiment shown in FIGS. 2-3, the constrained damping layer 106 defines two void regions 112 extending between the top surface 104 and the load element 108, and the load element 108 defines two vacuum channels 114 associated with the two void regions 112 for coupling the void regions 112 to an external vacuum 118. In alternative forms, the vacuum channels 114 may be defined passing through the device body 100 as shown in FIG. 6, or passing through the damping layer 106 as shown in FIG. 7, coupling the void regions 112 to the vacuum 118. In use, the load element 108 provides an inertial load on the damping layer 106, and the void regions 112 are pneumatically sealed by the touching surfaces of the damping layer 106, the top surface 104, and the load element 108. The vacuum 118, through the channels 114, maintains the pressure in the void region 112 at a low value relative to the pressure outside the void region 112, to establish a pressure differential across the load element 108. The pressure differential provides an additional force, denoted by arrows F, which presses the load element 108 toward the top surface 104, keeps the damping layer 106 under compression, and secures the load element 108 and the damping layer 106 onto the top surface 104. In alternative embodiments, the channels 114 for coupling the void regions 112 to a low pressure also can be defined within the device body 100.

In another preferred embodiment, the damping layer 106 defines an array of void regions 112 that may include more than two void regions, and each of the void regions 112 are coupled to a low pressure by way of a channel extending from the void region 112 through the load element 108. The constrained damping layer 106 is preferably characterized by a relatively high loss factor, for example, greater than 0.5. In one preferred embodiment, the constrained damping layer 106 is characterized by a loss factor of 1.0. An example of commercially available material with high loss factor is thermoplastic material, for example, materials sold under trademark ISODAMP®.

Figure 4:
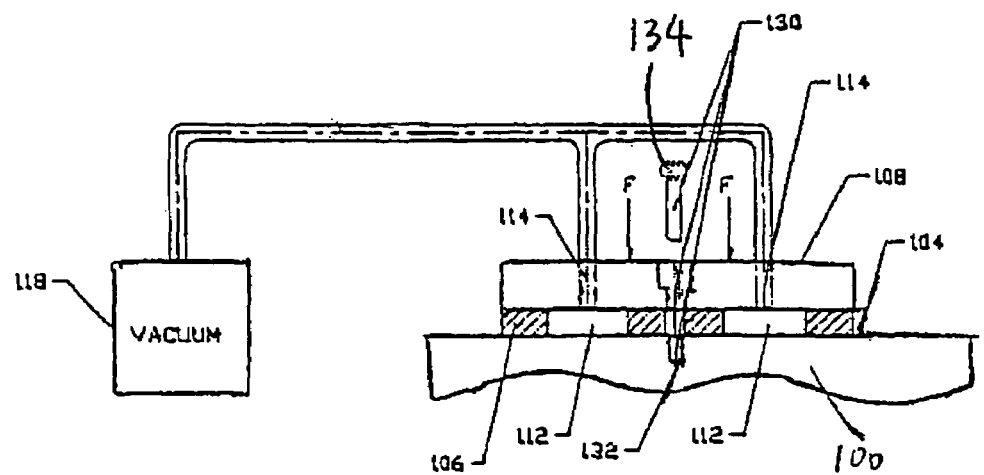
FIG. 4 is a cross-sectional view of a constrained layer damping assembly according to another preferred embodiment of the present invention, taken along the axis X-X.
Figure 5:
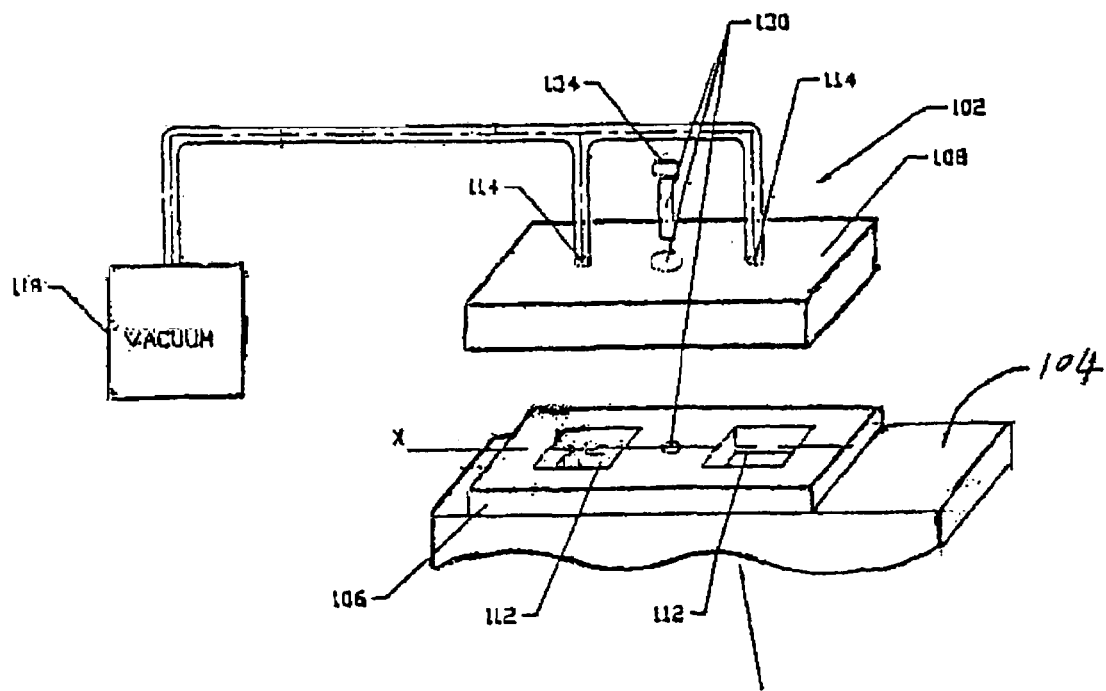
FIG. 5 is an exploded perspective view of the constrained layer damping assembly in FIG. 4.

FIGS. 4-5 show a cross-sectional view and an exploded perspective view of another preferred embodiment of the present invention, in which the constrained layer damping assembly 102 is provided with a lockdown assembly 130 to lock the assembly 102 to the top surface 104 of the device body 100 when the constrained layer damping assembly 102 is not in use, preventing the load element 108 and the damping layer 106 from being removed from the device 100. The lockdown assembly 130 includes at least one hole 132 passing through the load element 108 and the damping layer 106, and extending into at least a portion of the device body 100, and at least one bolt 134 to be screwed into the hole 132 for locking the load element 108 and the damping layer 106 to the device body 100. In one preferred embodiment, a distal portion of the hole 132 defined in the device body 100 is threaded, and a distal end of the bolt 134 is also threaded and adapted to engage the threads at the distal portion of the hole 132. The hole 132 is pneumatically isolated from the void regions 112 in the damping layer 106. When the constrained layer damping assembly 102 is in use, the bolt 134 is removed out of the hole 132, so that no vibratory energy is transferred through the bolt 134. In another preferred embodiment, multiple holes and bolts are provided to secure the load element 108 and the damping layer 106 to the device body 100.

The constrained layer damping assembly can be used with head/disk testers with the constrained layer damping assembly mounted on a surface of a magnetic head carriage. Exemplary magnetic head/disk testers are described in U.S. Pat. No. 6,006,614 and U.S. Pat. No. 6,242,910, which are incorporated herein by reference. It should be understood by the person in the art that the constrained layer damping assembly also can be employed in devices other than head/disk testers, in which vibration damping/reduction/isolation is desired.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A constrained layer damping assembly for a rigid base member extending along a reference axis and having a lateral surface aligned with said reference axis, wherein said lateral surface exhibits vibratory motion when said base member is driven by externally applied forces, comprising:
   A. a substantially gas impervious damping layer disposed on at least a portion of said lateral surface, wherein said damping layer is characterized by a relatively high loss factor;
   B. a load element disposed on said damping layer, said load element having a first surface facing last said surface; and
   C. means for positioning said load element with respect to said lateral surface whereby said damping layer is under compression,
   wherein said positioning means includes at least one void region in said damping layer extending from said lateral surface to said first surface of said load element, and includes means for coupling a low pressure to said void region relative to the pressure external to said constrained layer damping assembly to establish a pressure differential across said load element and effect said positioning of said load element with respect to said lateral surface, whereby said damping layer is under compression.

2. A constrained layer damping assembly according to claim 1, wherein said lateral surface includes a planar portion, said damping layer is disposed over at least a portion of said planar portion.

3. A constrained layer damping assembly according to claim 1, wherein said damping layer includes an array of void regions extending between said lateral surface and said load element, and each of said void regions are couplable to a low pressure by way of a channel extending from said void region through said load element.

4. A constrained layer damping assembly according to claim 1, wherein said load element is rigid.

5. A constrained layer damping assembly according to claim 1, wherein said loss factor is greater than 0.5.

6. A constrained layer damping assembly according to claim 5, wherein said loss factor is 1.0.

7. A constrained layer damping assembly according to claim 1, further comprising a lockdown assembly including:

A. at least one hole passing through said load element and said damping layer and extending into at least a portion of said base member, at least a portion of said hole in said base member being threaded, wherein said hole is pneumatically isolated from said void region in said damping layer; and B. a bolt being threaded at a distal end and being adapted for passing through said hole, said threaded distal end being adapted for engaging said threaded portion of said hole in said base member, whereby said lockdown assembly secures said load element and said damping layer to said base member.

8. A constrained layer damping assembly comprising:

A. a base member extending along a reference axis and having a lateral surface aligned with said reference axis;

B. a substantially gas impervious damping layer disposed on at least a portion of said lateral surface;

C. a load element disposed on said damping layer, said load element having a first surface facing said lateral surface; and D. means for positioning said load element with respect to said lateral surface whereby said damping layer is under compression, wherein said positioning means includes at least one void region in said damping layer extending from said lateral surface to said first surface of said load element, and includes means for coupling a low pressure to said void region relative to the pressure external to said constrained layer damping assembly to establish a pressure differential across said load member and effect said positioning of said load element with respect to said lateral surface, whereby said damping layer is under compression.

9. A constrained layer damping assembly according to claim 8, wherein said lateral surface includes a planar portion, said damping layer is disposed over at least a portion of said planar portion.

10. A constrained layer damping assembly according to claim 8, wherein said damping layer includes an array of void regions extending between said lateral surface and said load element, and each of said void regions are couplable to a low pressure by way of a channel extending from said void region through said load element.

11. A constrained layer damping assembly according to claim 8, wherein said load element is rigid.

12. A constrained layer damping assembly according to claim 8, wherein said loss factor is greater than 0.5.

13. A constrained layer damping assembly according to claim 12, wherein said loss factor is 1.0.

14. A constrained layer damping assembly according to claim 8, further comprising a lockdown assembly including:

A. at least one hole passing through said load element and said damping layer and extending into at least a portion of said base member, at least a portion of said hole in said base member being threaded, wherein said hole is pneumatically isolated from said void region in said damping layer; and B. a bolt being threaded at a distal end and being adapted for passing through said hole, said threaded distal end being adapted for engaging said threaded portion of said hole in said base member, whereby said lockdown assembly secures said load element and said damping layer to said base member.

15. A constrained layer damping assembly according to claim 1, wherein said means for coupling a low pressure to said void region relative to the pressure external to said constrained layer damping assembly comprises at least one channel associated with said void region for coupling said void region to a vacuum.

16. A constrained layer damping assembly according to claim 15, wherein said at least one channel is defined passing through said load element for coupling said void region to said vacuum.

17. A constrained layer damping assembly according to claim 15, wherein said at least one channel is defined passing through said base member for coupling said void region to said vacuum.

18. A constrained layer damping assembly according to claim 15, wherein said at least one channel is defined passing through said damping layer for coupling said void region to said vacuum.

19. A constrained layer damping assembly according to claim 8, wherein said means for coupling a low pressure to said void region relative to the pressure external to said constrained layer damping assembly comprises at least one channel associated with said void region for coupling said void region to a vacuum.

20. A constrained layer damping assembly according to claim 19, wherein said at least one channel is defined passing through said load element for coupling said void region to said vacuum.

21. A constrained layer damping assembly according to claim 19, wherein said at least one channel is defined passing through said base member for coupling said void region to said vacuum.

22. A constrained layer damping assembly according to claim 19, wherein said at least one channel is defined passing through said damping layer for coupling said void region to said vacuum.

* * * * *

UNITED STATES PATENT AND TRADEMARK OFFICE
CERTIFICATE OF CORRECTION

| | | |
|---|---|---|
| PATENT NO. | : 7,240,777 B2 | Page 1 of 1 |
| APPLICATION NO. | : 10/919133 | |
| DATED | : July 10, 2007 | |
| INVENTOR(S) | : Nahum Guzik et al. | |

It is certified that error appears in the above-identified patent and that said Letters Patent is hereby corrected as shown below:

Column 4, lines 35 and 36, currently reads as follows:
"load element having a first surface facing last said surface; and"

please correct to read as follows:
-- load element having a first surface facing said lateral surface; and --

Signed and Sealed this

Fourth Day of September, 2007

JON W. DUDAS
*Director of the United States Patent and Trademark Office*